Oct. 7, 1924.
A. R. MIELKE
1,510,692
FASTENER FOR ANTISKID CHAINS AND OTHER ARTICLES
Filed Nov. 11, 1922
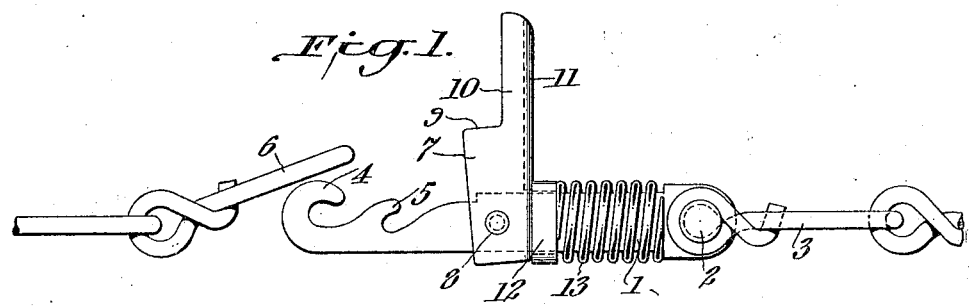
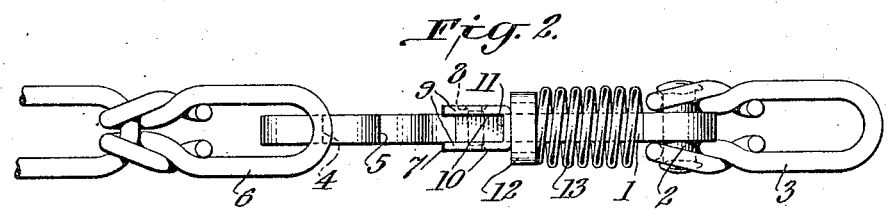
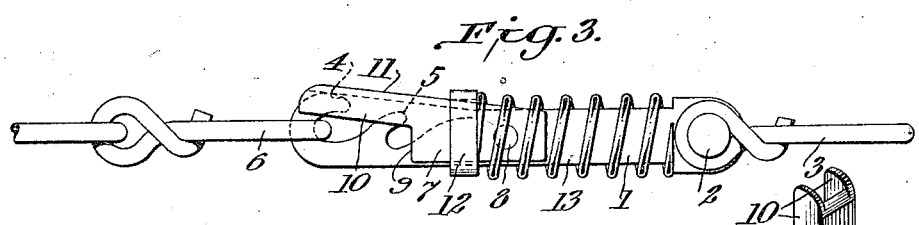
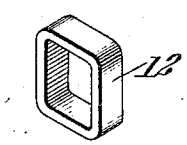
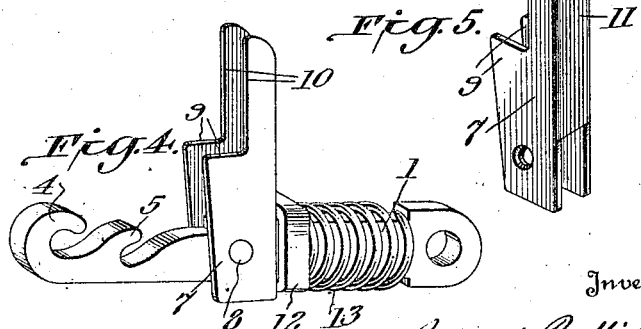
Inventor:
August R. Mielke
Attorney Patented Oct. 7, 1924.

1,510,692

UNITED STATES PATENT OFFICE.

AUGUST R. MIELKE, OF MELVIN, ILLINOIS.

FASTENER FOR ANTISKID CHAINS AND OTHER ARTICLES.

Application filed November 11, 1922. Serial No. 600,277.

*To all whom it may concern:*

Be it known that I, AUGUST R. MIELKE, a citizen of the United States, residing at Melvin, in the county of Ford and State of Illinois, have invented a certain new and useful Improvement in Fasteners for Antiskid Chains and Other Articles, of which the following is a full, clear, and exact description.

The object of this invention is to provide a fastener, in the nature of a spring-pressed clasp, for use in connecting the ends of a chain, and more particularly for use in connecting the chains of anti-skid devices for use on wheels having pneumatic tires.

The invention consists of a hook member having any desired number of bills, and adapted to be fixed to one end of a chain, and having a latch member pivotally mounted on it and adapted to be hooked over the bills and held so engaged by means of a spring-pressed sleeve, in such way that it will be practically impossible for the latch member to be moved accidentally to release the chain by reason of the strains on the chain in use, as I will proceed now to describe and finally claim.

In the accompanying drawings illustrating the invention, in the several figures of which like parts are similarly designated, Figure 1 is a side elevation showing the latch member open. Fig. 2 is a top plan view also showing the latch member open. Fig. 3 is a side elevation showing the latch member closed. Fig. 4 is a perspective view of the fastener alone. Fig. 5 is a rear perspective view of the latch member detached. Fig. 6 is a perspective view of the sleeve member detached.

The fastener comprises a bar 1 of metal, of rectangular or any other suitable shape, having at one end a cross pin or lugs 2, to which one end of the chain 3 may be movably or otherwise connected. The forward end of the bar is reduced somewhat and provided with one, two or more hook bills 4 and 5, which may be of the same or different sizes and adapted to be engaged by a link 6 of the chain, the links 3 and 6 being at opposite ends of the chain to be fastened.

On the bar 1 is pivotally mounted a latch member 7, the pivot being indicated at 8. This latch member has the side portions 9 of substantially the depth of the bar 1 at the point of connection therewith and of a length and depth sufficient to close down over the hooked end of the bar in the rear of the hook or hooks, to serve to reinforce the latch member against lateral strains and also to guide it in its pivotal movement in opening and closing. The forward ends 10 of this latch member are of less depth than the portions 9 and extend outwardly to the tip of the outermost bill so as to close the entrances to these bills and thus enclose the link 6 when placed in either of the hooks.

The sides 9 and 10 of the latch member are connected by the back piece 11.

Mounted on the bar back of the latch member is a sliding sleeve 12 normally pressed into engagement with the latch member by means of a stiff spring 13 mounted on the bar.

The connecting piece 11, of course, will be cut away adjacent to pivot 8 in order to permit the latch member to be turned up normal to the bar, as shown in Figs. 1, 2 and 4, in order to open the bills or hooks for the reception or release of the chain, and also be turned down over the bills or hooks to lock the chain link, as shown in Fig. 3.

When the device is arranged in fastening position as shown in Fig. 3, the spring will drive the sleeve over the rear end of the latch member and hold it in this position as against accidental displacement and also against the accidental displacement of the latch member. To release the latch member, the sleeve 12 must be moved backwardly against the tension of the spring far enough to permit the latch member to be turned up, as on its pivot, as in Figs. 1, 2 and 4.

Of course the use of a plurality of hooks or bills will permit the taking up of slack in the chain.

Variations in the details of construction and the arrangement of the component parts of the fastener are permissible within the principle of the invention and the claim following.

What I claim is:—

A fastener, comprising a bar with a suitable number of hooks at one end, and means at its other end to assemble it for use with a chain, a latch member pivotally mounted on the bar in the rear of the hooked end and having side portions of substantially the depth of the bar next to its pivotal end and a hook-enclosing portion at its outer end adapted to cover in the hooked end on top and at opposite sides, a sliding sleeve mounted on the bar in the rear of the latch member and adapted to embrace the latch member, and a spring normally impelling the sleeve into such engagement.

In testimony whereof I have hereunto set my hand this 8 day of November A. D. 1922.

AUGUST R. MIELKE.

Witnesses:
GEO. T. IRHL,
L. E. WHITNEY.